(12) United States Patent
Akirav et al.

(10) Patent No.: US 8,806,162 B2
(45) Date of Patent: *Aug. 12, 2014

(54) SWITCHING VISIBILITY BETWEEN VIRTUAL DATA STORAGE ENTITIES

(75) Inventors: Shay H. Akirav, Petach-Tikva (IL); Shiri Alexander, Modiin (IL); Yariv Bachar, Ma'abarot (IL); Evgeny Budilovsky, Yehud (IL); Elena Drobchenko, Raanana (IL); Asaf K. Ekshtein, Petach-Tikva (IL); Dov N. Hepner, Hertzelyia (IL); Aharon Lazar, Kiryat Ono (IL); Ofer Leneman, Kfar Saba (IL); Itay Maoz, Haifa (IL); Gil E. Paz, Yehud (IL); Tzafrir Z. Taub, Givaataim (IL); Neville Yates, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/466,652

(22) Filed: May 8, 2012

(65) Prior Publication Data

US 2012/0221820 A1 Aug. 30, 2012

Related U.S. Application Data

(63) Continuation of application No. 12/860,113, filed on Aug. 20, 2010.

(51) Int. Cl.
*G06F 12/02* (2006.01)
*G06F 12/08* (2006.01)
*G06F 17/30* (2006.01)

(52) U.S. Cl.
CPC ............. *G06F 12/02* (2013.01); *G06F 12/08* (2013.01); *G06F 17/30073* (2013.01)
USPC ............... 711/162; 711/100; 711/4; 711/1; 711/161; 707/634

(58) Field of Classification Search
CPC ........................................ G06F 12/02
USPC ........................................ 711/162
See application file for complete search history.

(56) References Cited

U.S. PATENT DOCUMENTS

| 2005/0080992 A1* | 4/2005 | Massey et al. ............... 711/114 |
| 2006/0161810 A1 | 7/2006 | Bao |
| 2006/0179218 A1 | 8/2006 | Burkey |

(Continued)

FOREIGN PATENT DOCUMENTS

| JP | 2009146169 A | 7/2009 |
| KR | 20020036176 A | 5/2002 |

OTHER PUBLICATIONS

Rui Yan et al., "An Implementation of Semi-synchronous Remote Mirroring System for SANs," GCC 2004 Workshops, LNCS 3252, pp. 229-237, 2004, Springer-Verlag Berlin Heidelberg 2004.

*Primary Examiner* — Sanjiv Shah
*Assistant Examiner* — Gautam Sain
(74) *Attorney, Agent, or Firm* — Griffiths & Seaton PLLC (57) ABSTRACT

Visibility of a data storage entity on a first storage system is switched to a replicated data storage entity on a second storage system. Data from the data storage entity is replicated from the first storage system to the second storage system using a common serial number. The data storage entity is hidden from the first storage system by concealing the common serial number. An ejection of the data storage entity from the first storage system is automated, and the replicated data storage entity is introduced to the second storage system.

8 Claims, 8 Drawing Sheets

(56) References Cited

U.S. PATENT DOCUMENTS

| | | | |
|---|---|---|---|
| 2008/0222344 A1* | 9/2008 | Upadhyayula | 711/4 |
| 2009/0006733 A1* | 1/2009 | Gold et al. | 711/111 |
| 2009/0100223 A1 | 4/2009 | Murayama et al. | |
| 2009/0113109 A1 | 4/2009 | Nelson et al. | |
| 2010/0070725 A1* | 3/2010 | Prahlad et al. | 711/162 |
| 2011/0066799 A1* | 3/2011 | Gold | 711/111 |

* cited by examiner

SWITCHING VISIBILITY BETWEEN VIRTUAL DATA STORAGE ENTITIES

CROSS-REFERENCE TO RELATED APPLICATIONS

This application is a Continuation of U.S. patent application Ser. No. 12/860,113, filed Aug. 20, 2010.

FIELD OF THE INVENTION

The present invention relates in general to computers, and more particularly to apparatus, method and computer program product embodiments for switching visibility between virtual data storage entities.

DESCRIPTION OF THE RELATED ART

Replicated data systems may externalize various logical data storage entities, such as files, data objects, backup images, data snapshots or virtual tape cartridges. It is often required that such data storage entities be replicated from their origin site to remote sites. Replicated data entities enhance fault tolerance abilities and availability of data. While several existing approaches may be used to perform data replication, and specifically, replication of virtual cartridges or data storage entities, these approaches have accompanying limitations that negatively affect replication efficiency, system performance and data consistency, require additional overhead, or any combination of the above challenges.

SUMMARY OF THE INVENTION

Data replication involves the backing up of data stored at a primary site by storing the exact duplicate of the data on a secondary or remote site. Using data replication processes provide a variety of benefits. Data replication has emerged in recent years as a highly important technological field in computing storage systems. Challenges to providing data replication functionality include aspects such as cloning of virtual cartridges on a primary storage site and replicating the data to a remote storage site.

Virtual storage components are found in a variety of computing environments. A typical virtual storage component is the magnetic tape cartridge used via a magnetic tape drive. Multiple tape drives may be contained in a tape library, along with several slots to hold tape cartridges. Such data storage systems utilize storage components (usually direct access storage, such as disk arrays) to virtually present tape libraries or tape drives. Both types of technologies are commonly used for backup and recovery purposes. Virtual tape libraries, which integrate with existing backup software and existing backup and recovery processes, enable typically faster backup and recovery operations.

In view of the current state of the art, a need exists for a mechanism for replication or cloning of data on a virtual cartridge to a separate virtual cartridge from a primary storage site to a remote storage site. Such a mechanism is needed to increase backup and replication volume, increase the amount of possible data stored each day, and reduce the amount of storage servers. Accordingly, various embodiments for switching visibility between virtual data storage entities in a data storage environment using a processor device are provided. In one embodiment, by way of example only, visibility of a data storage entity on a first storage system is switched to a replicated data storage entity on a second storage system. Data from the data storage entity is replicated from the first storage system to the second storage system using a common serial number. The data storage entity is hidden from the first storage system by concealing the common serial number. An ejection of the data storage entity from the first storage system is automated, and the replicated data storage entity is introduced to the second storage system.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
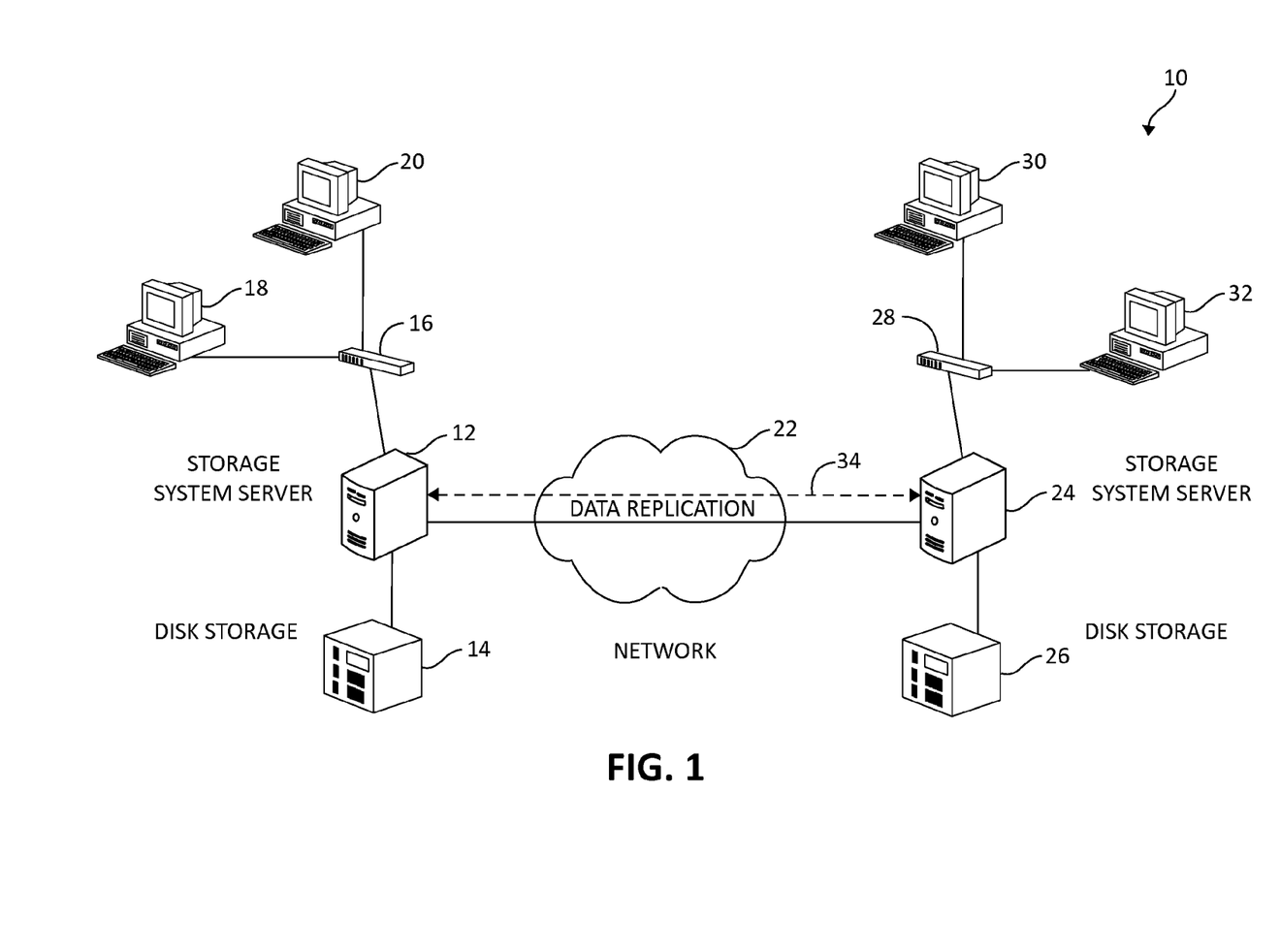
FIG. 1 illustrates an exemplary computing environment in which aspects of the present invention may be implemented.

Turning now to FIG. 1, exemplary architecture 10 of data storage systems (e.g., virtual tape systems) in a computing environment is depicted. Architecture 10 provides storage services to local hosts 18 and 20, and replicate data to remote data storage systems as shown. A local storage system server 12 in communication with a storage device 14 is connected to local hosts 18 and 20 over a network including components such as Fibre channel switch 16. Fibre channel switch 16 is capable, for example, of executing commands (such as small computer systems interface (SCSI) commands) for tape devices. The skilled artisan will appreciate that architecture 10 may include a variety of storage components. For example, storage devices 14 may include conventional hard disk drive (HDD) devices, or may include solid state drive (SSD) devices.

Local storage system server 12 is connected over network 22 to a remote storage system server 24. Remote server 24 communicates with a locally connected disk storage device 26, and with locally connected hosts 30 and 32 via another network and network component 28 such as Fibre channel switch 28. Network 22 may include a variety of network topologies, such as a wide area network (WAN), a local area network (LAN), a storage area network (SAN), and other configurations. Similarly, switches 16 and 28 may include other types of network devices.

Architecture 10, as previously described, provides local storage services to local hosts, and provides replicate data to the remote data storage systems (as denoted by data replication functionality using arrow 34). As will be described, various embodiments of the present invention and claimed subject matter may be implemented on architectures such as architecture 10.

Figure 2:
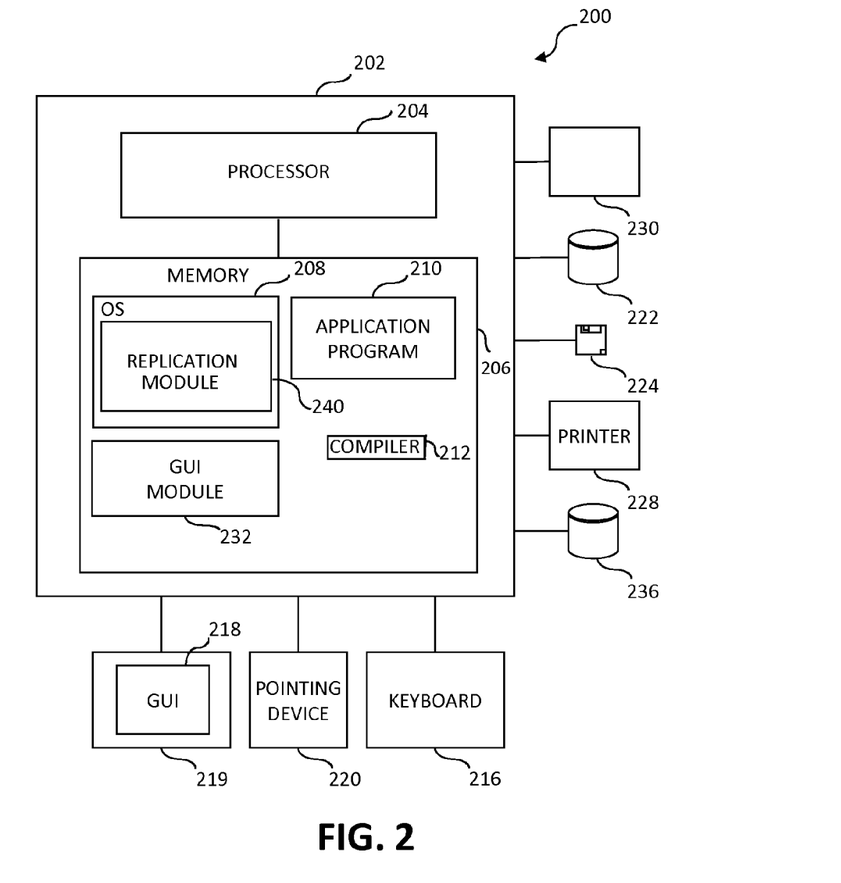
FIG. 2 illustrates an exemplary computing device including a processor device in a computing environment such as the computing environment shown in FIG. 1.

FIG. 2 illustrates a portion 200 of an exemplary computer environment that can be used to implement embodiments of the present invention. A computer 202 comprises a processor 204 and a memory 206, such as random access memory (RAM). In one embodiment, storage system server 12 (FIG. 1) may include components similar to those shown in computer 202. The computer 202 is operatively coupled to a display 219, which presents images such as windows to the user on a graphical user interface 218. The computer 202 may be coupled to other devices, such as a keyboard 216, a mouse device 220, a printer 228, etc. Of course, those skilled in the art will recognize that any combination of the above components, or any number of different components, peripherals, and other devices, may be used with the computer 202.

Generally, the computer 202 operates under control of an operating system (OS) 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. In one embodiment of the present invention, the OS 208 facilitates the backup mechanisms. Although the GUI module 232 is depicted as a separate module, the instructions performing the GUI functions can be resident or distributed in the operating system 208, the application program 210, or implemented with special purpose memory and processors. OS 208 includes a replication module 240 which may be adapted for carrying out various processes and mechanisms in the exemplary embodiments described below, such as performing various visibility switching functionality. Replication module 240 may be implemented in hardware, firmware, or a combination of hardware and firmware. In one embodiment, replication module 240 may also be considered a "replication manager" for performing and/or managing replication activity as further described. In one embodiment, the replication module 240 may be embodied as an application specific integrated circuit (ASIC). As the skilled artisan will appreciate, functionality associated with the replication module 240 may also be embodied, along with the functionality associated with the processor 204, memory 206, and other components of computer 202, in a specialized ASIC known as a system on chip (SoC). Further, the functionality associated with the replication module (or again, other components of the computer 202) may be implemented as a field programmable gate array (FPGA).

As depicted in FIG. 2, the computer 202 includes a compiler 212 that allows an application program 210 written in a programming language such as COBOL, PL/1, C, C++, JAVA, ADA, BASIC, VISUAL BASIC or any other programming language to be translated into code that is readable by the processor 204. After completion, the computer program 210 accesses and manipulates data stored in the memory 206 of the computer 202 using the relationships and logic that was generated using the compiler 212. The computer 202 also optionally comprises an external data communication device 230 such as a modem, satellite link, Ethernet card, wireless link or other device for communicating with other computers, e.g. via the Internet or other network.

Data storage device 222 is a direct access storage device (DASD) 222, including one or more primary volumes holding a number of datasets. DASD 222 may include a number of storage media, such as hard disk drives (HDDs), tapes, and the like. Data storage device 236 may also include a number of storage media in similar fashion to device 222. The device 236 may be designated as a backup device 236 for holding backup versions of the number of datasets primarily stored on the device 222. As the skilled artisan will appreciate, devices 222 and 236 need not be located on the same machine. Devices 222 may be located in geographically different regions, and connected by a network link such as Ethernet. Devices 222 and 236 may include one or more volumes, with a corresponding volume table of contents (VTOC) for each volume.

In one embodiment, instructions implementing the operating system 208, the computer program 210, and the compiler 212 are tangibly embodied in a computer-readable medium, e.g., data storage device 220, which may include one or more fixed or removable data storage devices 224, such as a zip drive, floppy disk, hard drive, DVD/CD-ROM, digital tape, flash memory card, solid state drive, etc., which are generically represented as the storage device 224. Further, the operating system 208 and the computer program 210 comprise instructions which, when read and executed by the computer 202, cause the computer 202 to perform the steps necessary to implement and/or use the present invention. For example, the computer program 210 may comprise instructions for implementing the grid set manager, grid manager and repository manager previously described. Computer program 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Embodiments of the present invention may include one or more associated software application programs 210 that include, for example, functions for managing a distributed computer system comprising a network of computing devices, such as a storage area network (SAN). Accordingly, processor 204 may comprise a storage management processor (SMP). The program 210 may operate within a single computer 202 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those skilled in the art. (Note that a fibre channel SAN is typically used only for computers to communicate with storage systems, and not with each other.)

Throughout the following description and claimed subject matter, the following terminology, pertaining to the illustrated embodiments, is described. A "replication policy" is intended to refer to a set of rules which define replication: (i) replication target, (ii) visibility switching target, (iii) replication priority (Hi/Medium/Low), and (iv) ranges of cartridges. A "replication target" is intended to refer to a receiver for the local system's replication activity. A "switching visibility target" is intended to refer to a virtual tape library defined at the receiver's system. A "replication queue" is intended to refer to a persistent disk representation of all queued and running replication activities of the system. When an activity or replication activities is completed or finished, the activity or replication activities are removed from the queue. A "switching visibility queue" is intended to refer to a persistent disk representation of all queued and running switching visibility activities of the system. When an activity or replication activities is completed or finished, the activity or replication activities are removed from the queue. A "system" may include a computer system, a computer processor, a primary storage system, a remote storage system or any other component within a computer environment needed to carry out the claimed invention.

A "cartridge synchronization" is intended to refer to a process to determine whether a cartridge or data storage entity and its remote system's replica are completely aligned and the hold the same content. A "visibility attribute" is intended to refer to an attribute of a replica cartridge or replicated data entity, which indicates it is currently holding visibility to the cartridge from the remote backup application at the remote site. A "source library attribute" is intended to refer to an attribute of a replica cartridge or replicated data entity, which indicates its library ascription in the local system. A "eject event" is intended to refer to a system event, which is triggered by a backup application's "eject from library" operation, or by the system when displacing a library cartridge to be outside the library. A "replication done indication" is intended to refer to an asynchronous replication protocol message, which indicates that replication had finished successfully and that now the local cartridges and remote replica are synchronized. A "virtual library I/O slot" is intended to refer to a the import/export slots of a library which are the targets for cartridges that were ejected by a backup application's eject operation and are also used to lower inventory scan time when importing cartridges into a library. A "VTL" or "virtual tape library" is intended to refer to a virtual tape library—computer software emulating a physical library. A "replication manager" is intended to refer to a software component in charge of replication activity.

A "data storage entity", "data storage entities", "replicated data storage entity", or "replicated data storage entities" may include a singular, individual data storage entity or replicated data storage entity, and may also include multiple sets of data storage entities or replicated data storage entity or entities combined in a number of sets or groupings. A "cartridge" may include the term data storage entity, data storage entities, replicated data storage entity, replicated data storage entities, files, data objects, backup images, data snapshots, virtual tape cartridges, and other known art commonly known in the industry as a cartridge in a computer environment. Also, a primary storage site may refer to a first storage system, first storage site, and primary storage system. A remote storage site may be referred to as a secondary storage site, a secondary storage system, and a remote storage system.

The process of replicating data by cloning or replicating data from one virtual cartridge or cartridges onto a different virtual cartridge or cartridges are time consuming. Data centers deal with this issue by creating different time windows throughout the day to accommodate 1) backup activity, 2) replication activity, and 3) cloning activity. The challenge presented by different time windows results in reduced capacity in the capabilities of the storage servers for backup and replication volume. Hence, the reduced amount of the potential data to be stored each day require an increase multiple storage servers. Requiring multiple storage servers are more costly and need rigorous management in order to perform optimally in a user's environment.

Additional problems occur for replicating or cloning data when a user is using a "Single Domain" backup application to govern its storage environments. In other words, the user is using a single database (backup catalog) instance, at the network level, to ensure all sites are synchronized with the same data at all times. Such an environment prohibit multiple cartridges with the same barcodes cannot be allocated at different libraries across the network. This is due to the enforcement that each cartridge be required to have a unique barcode within the backup domain. Thus, during the replication operation, the replicated cartridge is not usable at the remote location since the replication process copies an exact replica including the barcode identification. Because the backup application already recognizes the cartridge located at a specific virtual library on the primary site it therefore cannot be located at two places simultaneously.

An efficient switching visibility of cartridges from a primary or first storage location site to a remote or secondary storage site process should address the following considerations: (1) the mechanism allows cloning activity to be run at the remote site and prevent interruptions to the primary site, (2) reduce the load on the primary or first storage site by allowing additional data to be written and replicated using the primary or first storage site's resources, (3) gain higher performance at the primary or first storage site also with the ability to marshal cloning on a remote location where performance consideration are of less magnitude, (4) allow for the user to automate an ejection of the virtual cartridge from a primary or secondary storage site and introduce the virtual cartridge at a remote or secondary storage site so the virtual cartridge is visible at the remote or secondary storage site ready to restore data, replicate data, or clone data.

In view of the foregoing, the illustrated embodiments enable to achieve a highly efficient process for switching visibility of cartridges from a primary or first storage site to a remote or secondary storage site, and also, address the earlier four aspects for efficient switching visibility as follows. First, the switching visibility target is configured. As part of an organization replication policy, the user decides to use remote cloning or replication of data in order to lower resource consumption on the primary storage site. The user defines the replication of data from the primary storage site to the remote storage site by specifying the remote storage site's server identification and the targeted virtual tape library identification on the remote storage site. Choosing the remote virtual library automatically indicates that the switching visibility is activated or turned on and is operating between the primary storage site's libraries and the remote storage site's virtual library. The user defines the ranges of cartridges which will participate in the switching visibility process.

Next, once the configuration for the switching visibility of cartridges from the primary storage site to the remote storage site is complete, the switching visibility of cartridges commences. The user prepares a backup application policy to eject certain cartridges when the backup is completed. The cartridges being backed-up are part of a backup set. Upon completion of the backup, an eject operation is triggered for the cartridges. The specific cartridges, identified for switching visibility, are ejected to the virtual library's input/output (I/O) slots. The primary storage system is handling the backup application eject operation. For each of the ejected cartridges the system issues an eject event. Each eject event is checked against all replication policies defined in the primary storage system, also known as the "sender." If the cartridges are defined in the context of any replication policy on the primary storage system there are two persistent requests created for each cartridge. A replication request is created and stored in a replication queue and a switching visibility request is created and stored in the switching visibility queue. With the primary storage system automatically displacing the ejected cartridges outside of the library on the primary storage system, an inventory scan will occur. After the inventory scan, the backup application will initiate as a result of the eject operation. At this point, the cartridges will no longer be visible in the backup application.

The switching visibility activities are loaded into a queue. Once the switching visibility request reaches the head of its queue and commences execution, the system performs a cartridge synchronization operation to determine if replication needs to be execute or if switching visibility can immediately start executing without waiting for the specific cartridge (an assumption is made that the cartridges are not synchronized). The switching visibility request stays queued until a "replication done" message is received. When a replication request obtains all needed resources to run, the system performs a cartridge synchronization operation to determine if the replication of data is required to be executed. In the general case, the replication of data needs to be executed. The replication of the data executes and returns a "replication done" message to the primary storage system, or sender, when the replication activity finishes for the specific cartridge. The replication process sets the replica cartridge's visibility attribute to "ON" or to an "active" status and associates the source library attribute to the source library from which the cartridge had been ejected. In the event the replication request is accommodated before visibility switching request, then the replication is already executing or had been completed executing at the time the visibility request is accommodated. In other words, the visibility switching cartridge synchronization operation either returns an approval to switch visibility (in case the replication of the data is complete), or requires a wait period during an opened replication activity that is currently executing.

Once the replication of data is complete, the cartridge is synchronized and cannot be written to since the cartridge is unknown to the backup application. The primary storage system sends a switch visibility message to the remote replica. The remote replica checks the availability of a free I/O slot and to determine if there is a free virtual library slot for the cartridge. If there are no free slots the operation fails and returns an error to the primary storage system. The primary storage system will retry the visibility operation for N number, or a predetermined number of hours. If time would exceed the N number predetermined number of hours mark, a final retry will be preformed. If the final retry fails then the operation fails and an error is issued to the user. When the retry fails both the original and the replica cartridges remain in a state outside a library and are not visible from either the primary or remote storage system. The system provides a way to import one of the non-visible cartridges back to a library in the primary storage system's server. Once there are free I/O and library slots, the system displaces the replica cartridge to the I/O slot of the chosen target virtual library. A user-defined backup application specific script or a manual backup application operation is used in order to import the replica from the I/O slot to the library slot. The script or user runs an inventory scan on the I/O slots to identify the replica cartridge. If the remote backup application does not share the same primary backup application's database/catalogue, an additional step of copying the database/catalogue is required in order for the remote backup application to be able to identify and utilize the replica cartridge. The replica cartridge can now be used by the remote backup application for activities such as remote cloning or replication. The switching visibility request is then deleted from the switching visibility queue.

The illustrated embodiments enable to achieve a highly efficient switching visibility of cartridges back from the remote storage system to the primary storage system as follows. The user or backup application ejects the replica from the remote storage system's library. The cartridge is automatically displaced to the I/O slot. A switching visibility request is created and is persistently stored in the queue. The cartridge is automatically displaced outside the library of the remote system. Once the request reaches the head of its queue the switching visibility request commences. The replica cartridge turns its visibility attribute to "OFF" or an inactive status. The switching visibility request is sent to the primary system. The primary system displaces the original cartridge to the source or primary storage system library's I/O slot. A user-defined backup application specific script or a manual backup application operation is used in order to import the origin from the I/O slot to the library slot.

In an additional embodiment, similar to the process of the primary storage system sending a switch visibility message to the remote replica, when switching visibility from the remote storage system back to the primary storage system, other processes may be performed in the event of no availability of a free I/O slot and a free virtual library slot for the cartridge, as previously described.

Turning now to FIGS. 3, 4, 5, and 6, exemplary methods 100, 300, 400, and 600 are provided for efficient switching visibility of cartridges from a primary or first storage location site to a remote or secondary storage site process. As one skilled in the art will appreciate, various steps in the method 100 may be implemented in differing ways to suit a particular application. In addition, the described method may be implemented by various means, such as hardware, software, firmware, or a combination thereof operational on or otherwise associated with the computing storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), solid state devices such as solid state drives (SSDs) and other types of storage mediums.

Figure 3:
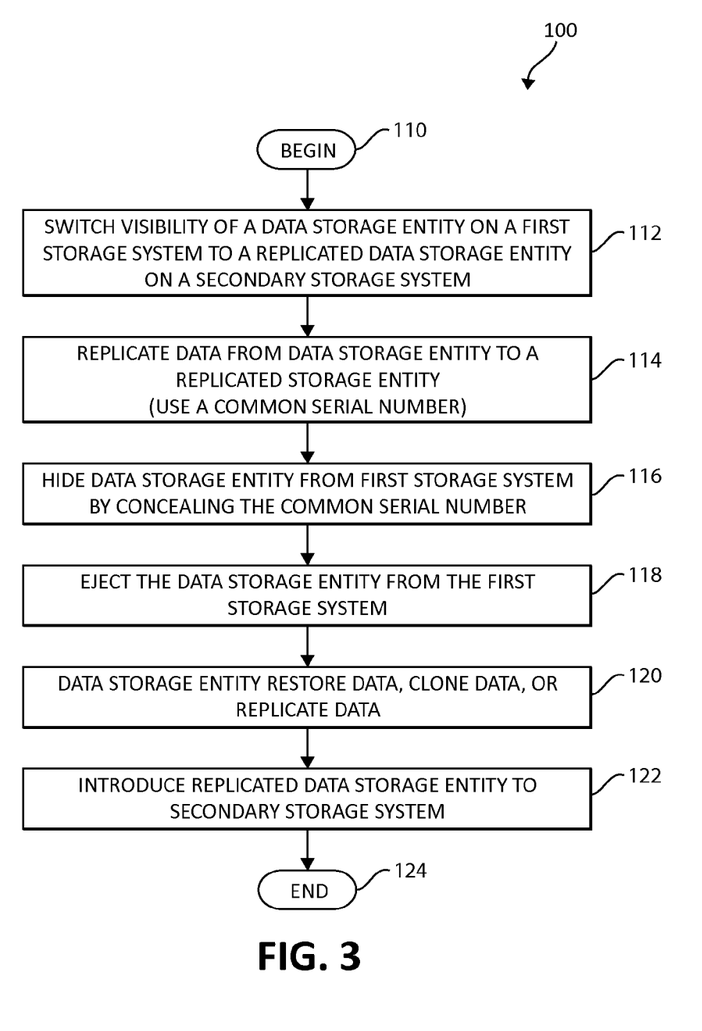
FIG. 3 illustrates exemplary method for switching visibility between virtual data storage systems.

Turning first to FIG. 3, a block diagram of exemplary efficient switching visibility of cartridges from a primary or first storage location site to a remote or secondary storage site process 100 presented. Method 100 begins (step 110) and performs the method of switching visibility of a data storage entity on a first storage system to a replicated data storage system entity on a secondary storage system (step 112). As a next step, data is replicated from a data storage entity to a replicated data storage entity and using a common serial number between the data storage entity and replicated data storage entity (step 114). The data storage entity is hide from the first storage system by concealing the common serial number (step 116). The first storage system ejects the data storage entity from the first storage system (step 118). The ejected data storage entity is now ready to restore data, clone data, or replicate data to a replicated data storage entity (step 120). The replicated data storage system is now ready to be introduced to the secondary storage system (step 122). The method ends (step 124).

While FIG. 3 describes, in block diagram format, an exemplary process for switching visibility of cartridges from a primary or first storage location site to a remote or secondary storage site process, additional processes relating to switching visibility of cartridges may occur prior to such switching visibility. This is due to the fact that new data is continually streamed to the first storage system as the computing storage environment operates. Additionally, processes relating to the switching visibility of cartridges from a primary or first storage location site to a remote or secondary storage site process may occur subsequent to such replication.

Figure 4:
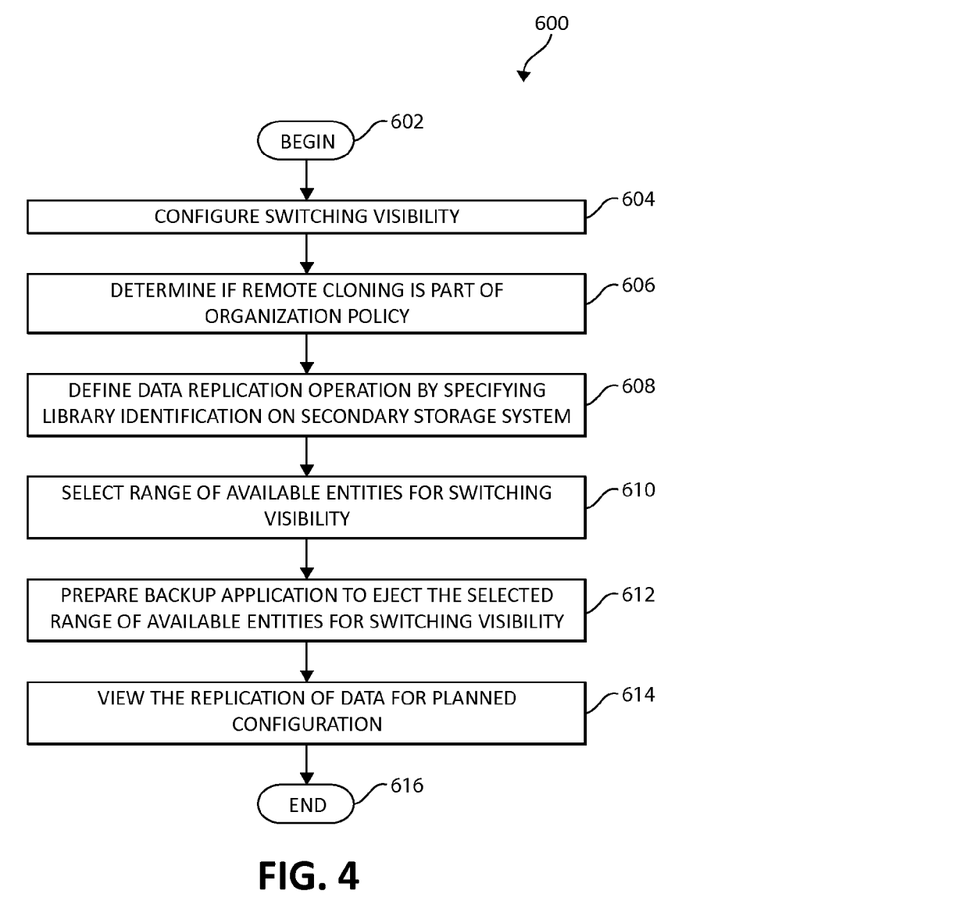
FIG. 4 illustrates an exemplary method for configuring a processor for switching visibility between virtual storage systems.

FIG. 4 provides an exemplary illustration of the switching visibility of cartridges from a primary or first storage location site to a remote or secondary storage site process previously described, in flow chart diagram form. Method 600 begins (step 604), with configuring a virtual cartridge or data storage entity for switching visibility from a first storage system to a secondary storage system. The method includes determining if remote cloning is part of an organization policy (step 606). The method defines a data replication operation by specifying the targeted library identification on the secondary storage system (step 608). A range of available virtual cartridges are selected for switching visibility (step 610). The method prepares a backup application to eject the selected range of available virtual cartridges for switching visibility from a first storage system to a secondary storage system (step 612). The replication of data for the planned configuration for the switching visibility of virtual cartridges may be viewed by the user (step 614). The method ends (step 616).

Figure 5A:
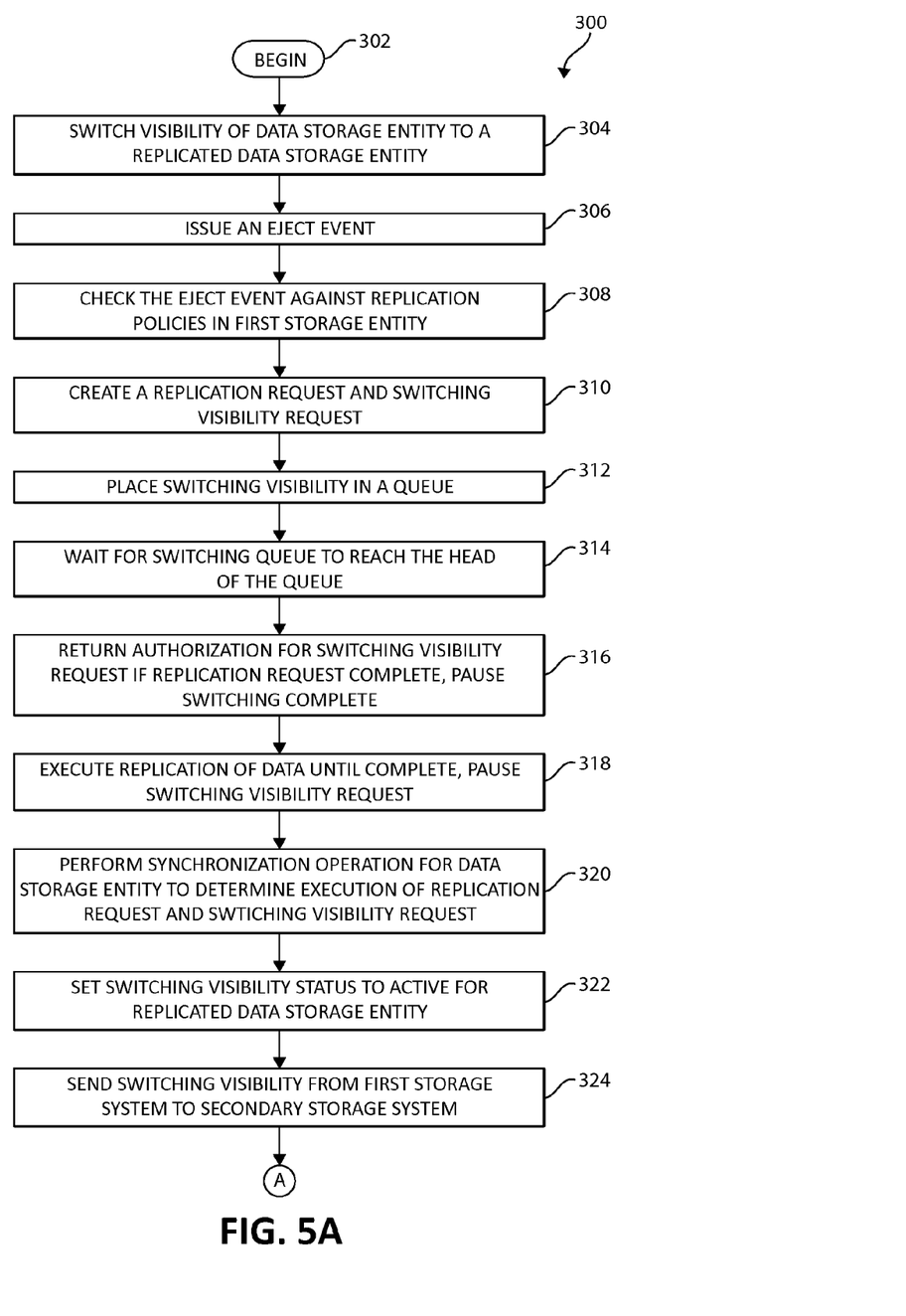
FIGS. 5A and 5B illustrate an exemplary method for switching visibility between a first storage system and a secondary storage system.
Figure 5B:
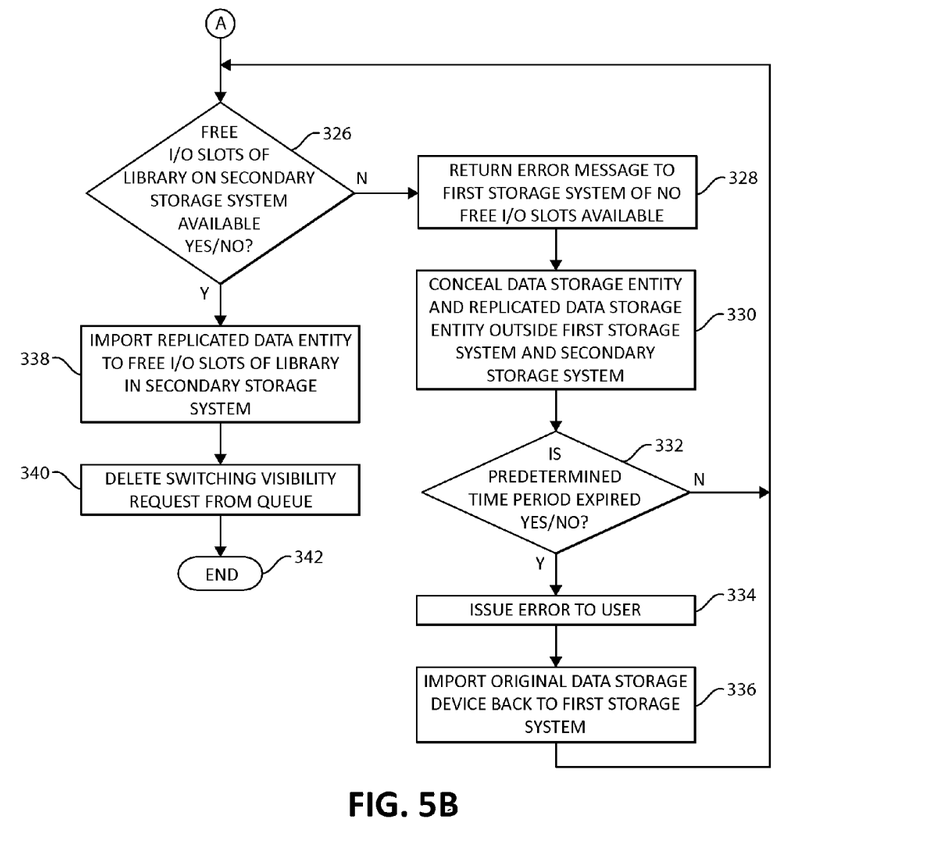

Turning first to FIGS. 5A and 5B, flow chart diagrams of exemplary switching visibility of cartridges from a primary or first storage location site to a remote or secondary storage site process 300 are presented. The method commences (step 304) and the user prepares a backup application policy to eject various cartridges when the backup of data is completed (step 306). The method allows for the eject event to be checked against replication policies associated with the first storage entity (step 308). Each eject event is checked against all replication policies defined in the primary storage system, also known as the "sender." If the cartridges are defined in the context of any replication policy on the primary storage system there are two persistent requests created for each cartridge. A replication request is created and stored in a replication queue and a switching visibility request is created and stored in the switching visibility queue (step 310). The switching visibility request is placed in queue (step 312) and waits for a period of time for the switching visibility queue to reach the head of the queue (step 314). The method performs a cartridge synchronization operation to determine if replication needs to be run or if switching visibility can immediately start executing without waiting for the specific cartridge (step 316). The switching visibility request stays queued until a "replication done" message is received. When a replication request obtains all needed resources to execute, the system performs a cartridge synchronization operation to determine if replication of data is required to be executed. The execution of the replication of data will continue until complete and the switching visibility request will pause until the replication of data request is complete (step 318). In the general case replication of data needs to be executed. The replication of the data runs and returns "Replication done" message to the primary storage system, or sender, when replication activity finishes for the specific cartridge (step 320). The replication process sets the replica cartridge's visibility attribute to "ON" or an active status and associate the source library attribute to the source library from which the cartridge had been ejected (step 322). In the event the replication request is accommodated before visibility switching request, then the replication is already executing or had been completed executing at the time the visibility request is accommodated. In other words, the visibility switching cartridge synchronization operation either returns an approval to switch visibility (in case the replication of the data is complete), or requires a wait period during an opened replication activity that is currently executing. Once the replication of data is complete, the cartridge is synchronized and cannot be written to since the cartridge is unknown to the backup application.

The method continues with the first storage system sending a switch visibility message to the remote replica (324). The remote replica checks the availability of a free I/O slot and to determine if there is a free virtual library slot for the cartridge (step 326). If there are no free slots the operation fails and returns an error to the primary storage system (step 328). When the retry fails both the original and the replica cartridges remain in a state outside a library and are not visible or concealed from either the primary or remote storage system (step 330). The primary storage system will retry the visibility operation for N number, or a predetermined number of hours (step 332). If time would exceed the N number of hours or predetermined number of hours mark, a final retry will be preformed. If the final retry fails then the operation fails and an error is issued to the user (step 334). The system provides a way to import one of the non-visible cartridges back to a library in the primary storage system's server (step 336).

Once there are free I/O and library slots, the system displaces the replica cartridge to the I/O slot of the chosen target virtual library (step 338). A user-defined backup application specific script or a manual backup application operation is used in order to import the replica from the I/O slot to the library slot. The script or user runs an inventory scan on the I/O slots to identify the replica cartridge. If the remote backup application does not share the same primary backup application's database/catalogue, an additional step of copying the database/catalogue is required in order for the remote backup application to be able to identify and utilize the replica cartridge. The replica cartridge can now be used by the remote backup application (for remote cloning for instance). The switching visibility request is deleted from the Visibility Switching Queue (step 340). The method ends (step 342).

Figure 6:
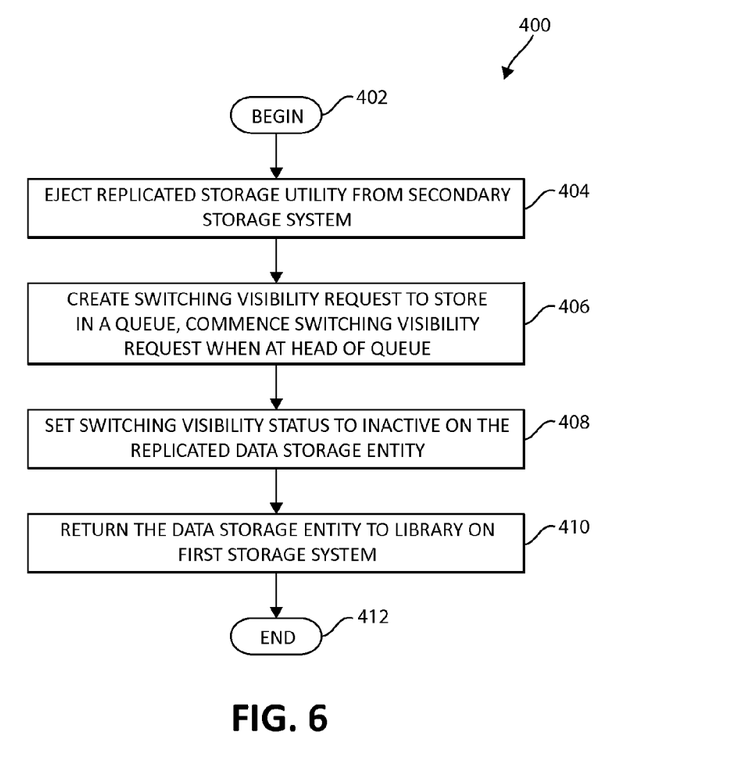
FIG. 6 illustrates an exemplary method for switching visibility back from a secondary storage system to the first storage system.

Turning first to FIG. 6, a flow chart diagram of exemplary switching visibility of cartridges back from a secondary storage location site to a first storage site process 400 presented. The method begins (step 402) and ejects the replica cartridge from the remote storage system's library (step 404). The replica cartridge is automatically displaced to the I/O slot. A switching visibility request is created and is persistently stored in the queue (step 406). The cartridge is automatically displaced outside the library of the remote system. Once the request gets to the head of its queue visibility switching starts. The replica cartridge turns its visibility attribute to "OFF" or an inactive status (step 408). The switching visibility request is sent to the primary system. The primary system displaces the original cartridge to the source or primary storage system library's I/O slot. A user-defined backup application specific script or a manual backup application operation is used in order to import the origin from the I/O slot to the library slot (step 410). The method ends (step 412).

Figure 7:
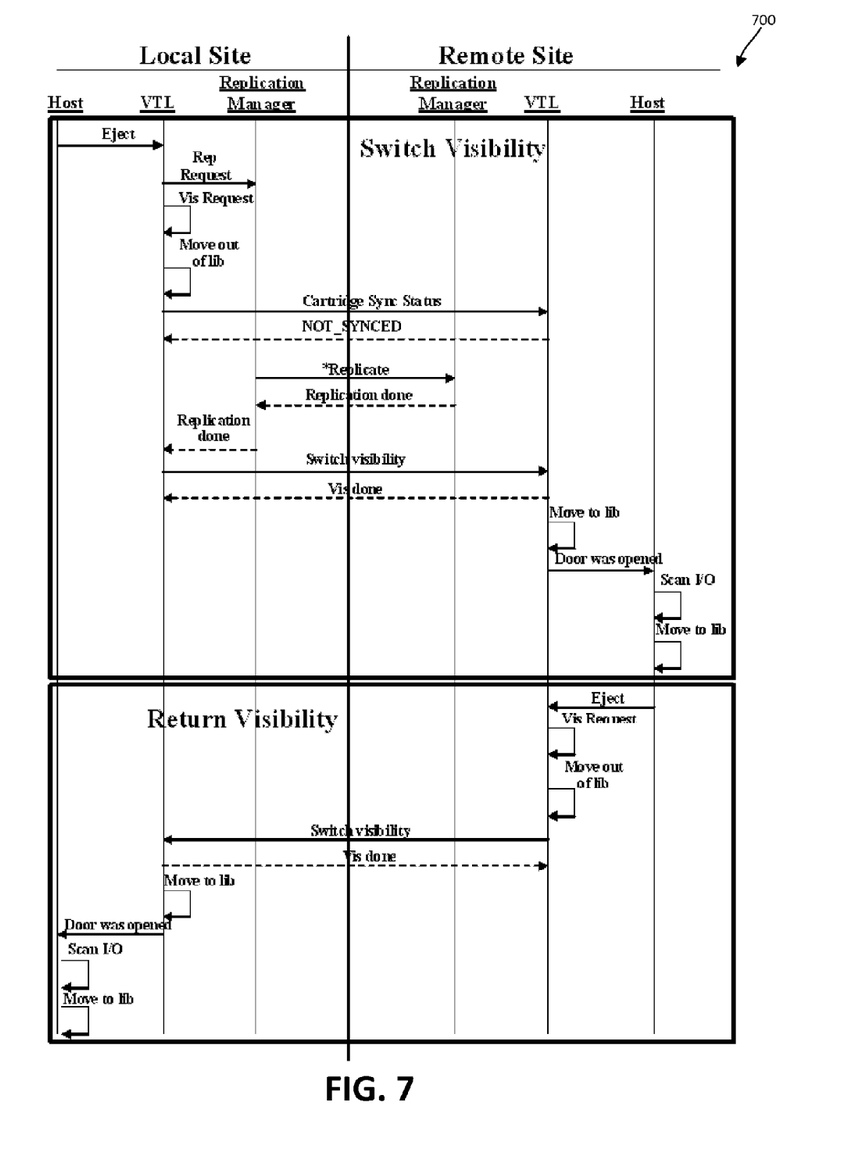
FIG. 7 illustrates an exemplary sequence diagram for switching visibility and switching visibility return.

Turning to FIG. 7, an exemplary sequence diagram for switching visibility and switching visibility return is illustrated. The depicted sequence diagram is a high-level sequence diagram of switching visibility for a virtual cartridge, assuming the user had defined visibility switching as needed for a specific cartridge. For example, in FIG. 7, a backup host, a virtual tape library emulation, and a replication component are each interacting with the emulation controls and the visibility attribute of a particular cartridge. The replication manager (i.e., replication module 240, FIG. 2) controls the replication for cartridges that are not fully synchronized between the primary storage system and the remote storage system. As illustrated, the visibility of the cartridge will not occur until the cartridge is completely replicated to the remote storage site. The depicted sequence diagram also illustrates an exemplary return switching visibility process from the remote storage system to the primary storage system. Additional features, as described in earlier figures, are also depicted as illustrated examples.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for switching visibility between virtual data storage entities in a data storage environment using a processor device, comprising:

selecting a range of a plurality of available entities for switching visibility, the plurality of available entities including a data storage entity;

queuing a switching visibility request for the range of the plurality of available entities including the data storage entity on a first storage system so as not to be visible to the first storage system;

replicating data from the data storage entity from the first storage system to the second storage system using a common serial number, while the switching visibility request is queueing;

hiding the data storage entity from the first storage system by concealing the common serial number;

ejecting the data storage entity from the first storage system;

after completion of the replicating, setting visibility of the replicated data storage entity to the second storage system to visible;

introducing the replicated data storage entity to the second storage system; and upon the switching visibility request reaching a head of the queue,
  executing the queue,
  performing a synchronizationion for the data storage entity to determine one of executing a replication request and executing the switching visibility request,
  executing the replicating of the data for the data storage entity until completion, the synchronization operation for the data storage entity performing one of returning an authorization for the switching visibility request if the replication request is completed and pausing the switching visibility request during the execution of the replication request,
  maintaining the queue until the authorization is received, and
  setting the switching visibility to an active status for the replicated data storage entity.

2. The method of claim 1, further including, the data storage entity restoring the data, cloning the data, and replicating the data, the replicating the data occurring one of before and during the ejection of the data storage entity.

3. The method of claim 1, wherein the switching visibility further includes configuring the switching visibility by:
  determining the use of cloning at a remote location as part of an organization replication policy,
  defining a data replication operation by specifying a library identification (ID) on the second storage system,
  viewing the replication of data for a planned configuration, and
  preparing a policy for a backup entities including the data storage entity.

4. The method of claim 1, further including ejecting one of a plurality of available entities to be outside a library of the first storage system, the plurality of available entities including the data storage entity.

5. The method of claim 1, further including, pursuant to the switching visibility of the data storage entity:
  issuing an eject event,
  checking the eject event against at least one replication policies defined in the first storage entity, and
  creating at least one of a replication request and a switching visibility request if one of a plurality of available entities are defined in one of the at least one replication policies, the plurality of available entities including the data storage entity.

6. The method of claim 1, further including pursuant to the switching visibility of the data storage entity:
  sending a switch visibility message from the first storage system to the second storage system,
  checking the availability of a plurality of free input/output (I/O) slots of a library in the second storage system,
  importing one of a plurality of available entities to one of the plurality of free I/O slots of a library in the second storage system, if there are no free I/O slots of the library in the second storage system the operation fails and an error is returned to the first storage system,
  retrying the switch visibility message for a predetermined period of time by the first storage system, an error is sent to the user upon a final retry of the switch visibility operation after expiration of the predetermined period of time, the replicated data storage entity remains concealed from either the first storage system and the second storage system,
  importing one of the plurality of available entities not visible back to the first storage system, wherein upon the availability of the free I/O of the library in the second storage system, displacing the replicated data storage the free I/O of the library, and
  deleting the switching visibility request from the switching visibility request queue.

7. The method of claim 1, further including returning the switching visibility of the replicated data entity by:
  ejecting the replicated data storage entity from the secondary storage system,
  creating a switching visibility request to store in a queue, the switching visibility request commencing upon reaching the head of the queue,
  setting the switching visibility to an inactive status in the replicated data entity, and
  returning the data storage entity to the library in the first storage system.

8. A method for switching visibility between virtual data storage entities in a data storage environment using a processor device, comprising:
  determining a use of cloning at a second storage system at a remote location as part of an organization replication policy to reduce resource consumption on a first storage system;
  defining a data replication operation from the first storage system to the second storage system by specifying a library identification (ID) on the second storage system;
  selecting a range of a plurality of available entities for switching visibility, the plurality of available entities including the data storage entity;
  queueing a switching visibility request for the range of the plurality of available entities including the data storage entity on a first storage system so as not to be visible to the first storage system;
  preparing a policy for a backup entities including the data storage entity;
  replicating data from the data storage entity from the first storage system to the second storage system using a common serial number, while the switching request is queueing;
  hiding the data storage entity from the first storage system by concealing the common serial number;
  ejecting the data storage entity from the first storage system;
  after completion of the replicating, setting visibility of the replicated data storage entity to the second storage system to visible;
  introducing the replicated data storage entity to the second storage system; and
  upon the switching visibility request reaching a head of the queue,
    executing the queue,
    performing a synchronization operation for the data storage entity to determine one of executing a replication request and executing the switching visibility request,
    executing the replicating of the data for the data storage entity until completion, the synchronization operation for the data storage entity performing one of returning an authorization for the switching visibility request if the replication request is completed and pausing the switching visibility request during the execution of the replication request,
    maintaining the queue until the authorization is received, and
    setting the switching visibility to an active status for the replicated data storage entity.

* * * * *